W. A. BARNES.
DELIVERY TRICYCLE.
APPLICATION FILED DEC. 2, 1914.
1,168,995.
Patented Jan. 18, 1916.
3 SHEETS—SHEET 2.
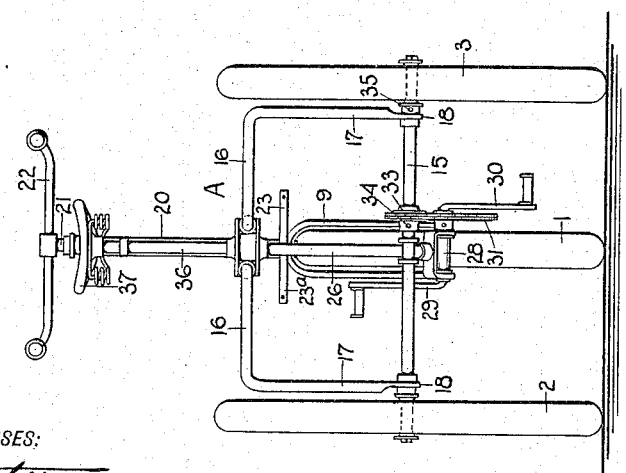
WITNESSES:
INVENTOR
William A. Barnes
BY
ATTORNEYS

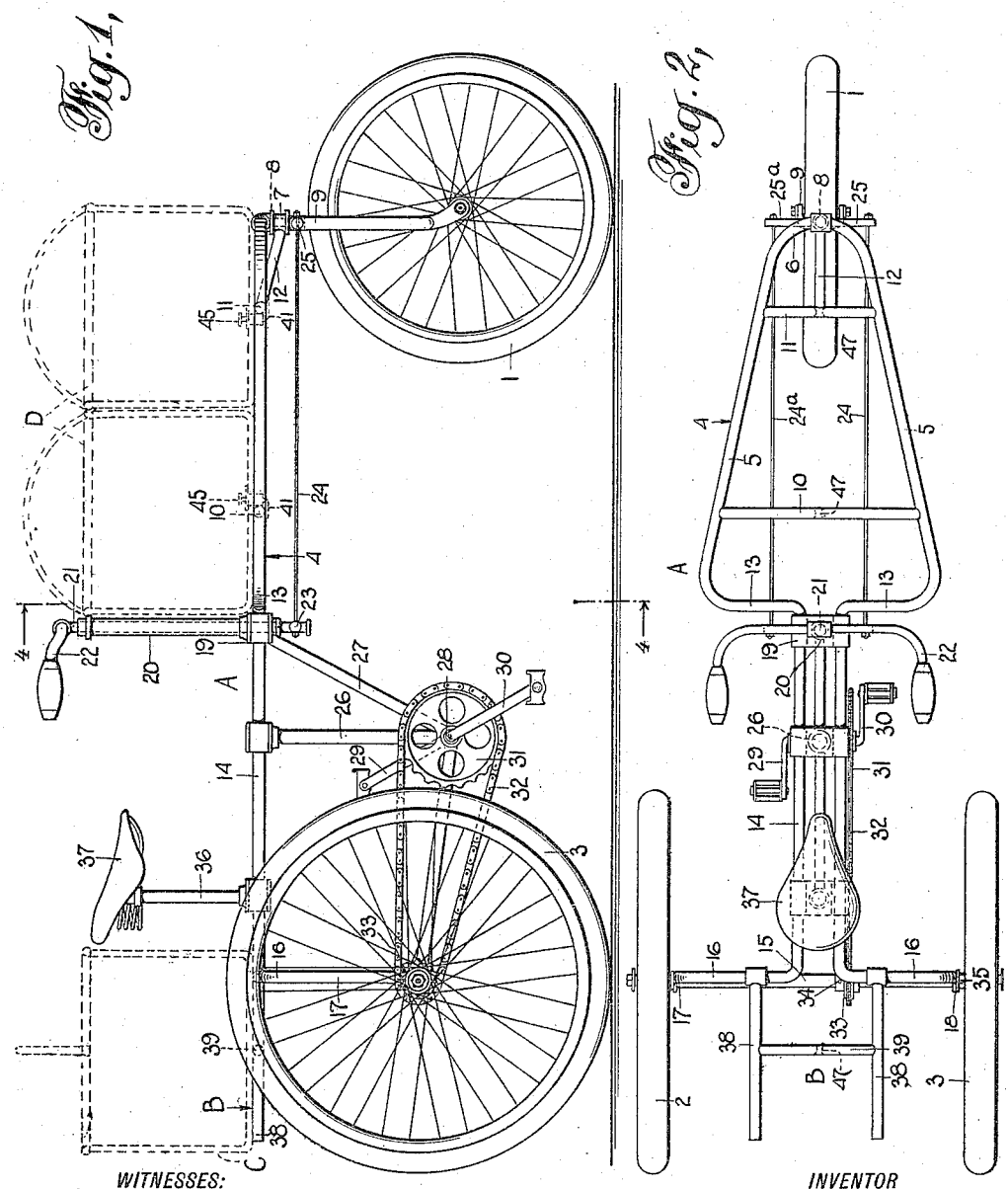

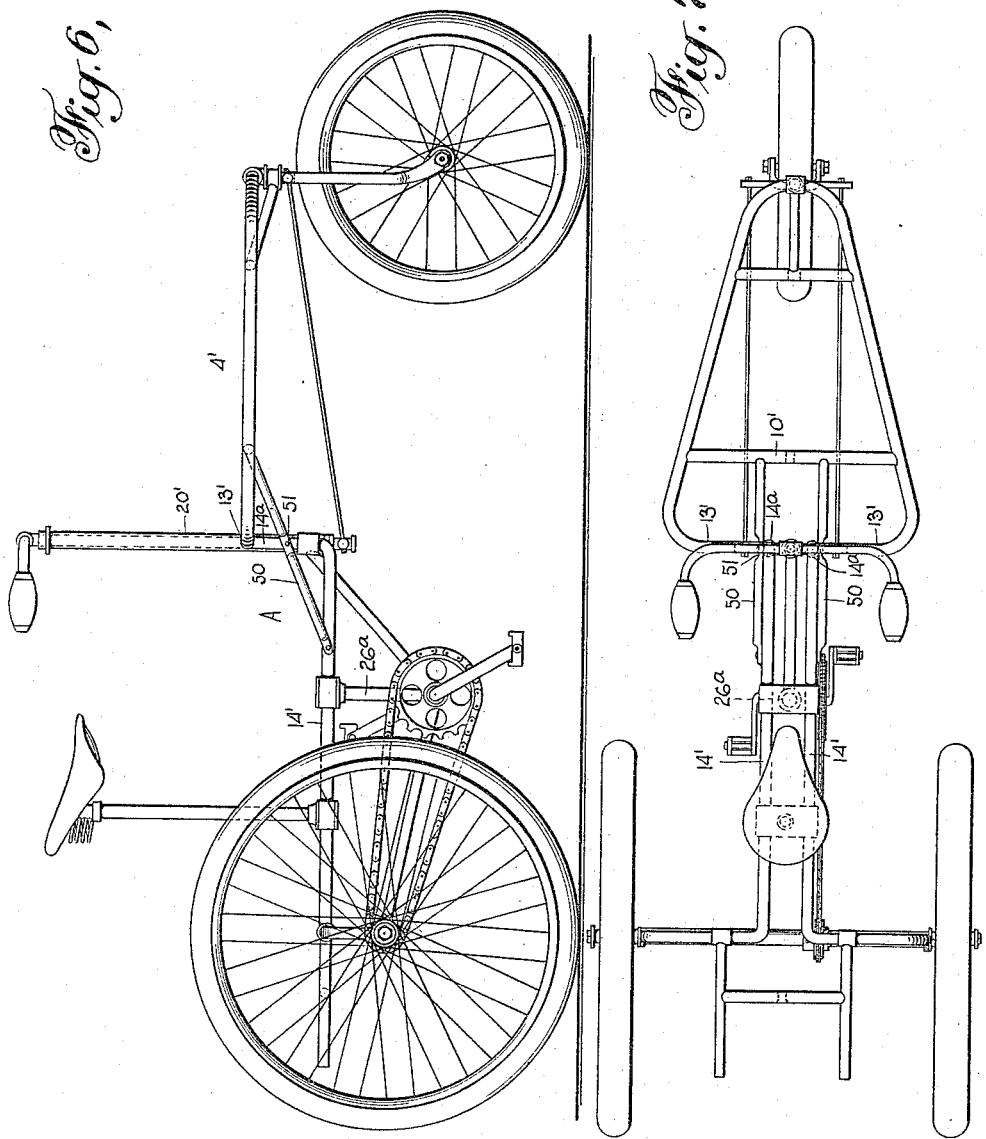

UNITED STATES PATENT OFFICE.

WILLIAM A. BARNES, OF NEW YORK, N. Y.

DELIVERY-TRICYCLE.

1,168,995. Specification of Letters Patent. Patented Jan. 18, 1916.

Application filed December 2, 1914. Serial No. 875,120.

*To all whom it may concern:*

Be it known that I, WILLIAM A. BARNES, a citizen of the United States, and a resident of the city of New York, Seaside, borough of Queens, county of Queens, and State of New York, have invented a new and Improved Delivery-Tricycle, of which the following is a full, clear, and exact description.

This invention relates to tricycles used for delivery purposes in the grocery and other trades.

The invention has for its general objects to improve and simplify the construction of vehicles of the character referred to so as to be comparatively simple and inexpensive to manufacture, of durable and substantial design, and possessing a large carrying capacity in proportion to its size, as the size is of special importance, since it is highly desirable that the tricycle can at night be wheeled into the store so as to avoid the necessity of garage expenses, which is the case with large size tricycles.

A further object of the invention is the provision of a tricycle having a novel frame structure whereby a flat platform for carrying baskets and the like is arranged in front of the steering post and between the latter and steering wheel, such platform having means whereby a plurality of baskets can be detachably locked thereto, and furthermore, the frame may be formed with a rear extension or platform for carrying additional baskets or the like.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a side view of the tricycle showing baskets or other receptacles by dotted lines; Fig. 2 is a plan view of the tricycle; Fig. 3 is a rear view; Fig. 4 is a sectional view on the line 4—4, Fig. 1; Fig. 5 is a detail sectional view of a lock for fastening a basket or other receptacle on the carrying platform; and Fig. 6 is a side view of a modified form of the invention; and Fig. 7 is a plan view thereof.

Referring to the drawings, 1 designates the front or steering wheel of the vehicle and 2 and 3 the rear wheels, one of which acts as a driver. The frame A not only connects the wheels together but is so designed as to embody platforms for supporting baskets or equivalent receptacles. In the present instance the body is constructed for a manually operated propelling means, but it is to be understood that the tricycle can be motor-driven if desired.

The frame A is made of metal tubing of suitable gage and comprises a front horizontally disposed platform 4 of approximately triangular form, as shown in Fig. 2, the side bars 5 of the platform being converged toward the front and are united at 6, where a depending tubular head or bearing 7 is provided for the stem 8 of the steering fork 9. The side bars 5 may be connected together and thereby braced by transverse bars 10 and 11, there being between the latter and the head 7 a brace 12. Adjacent the middle of the tricycle the side bars 5 are bent inwardly toward each other at 13, and thence continue rearwardly into longitudinal bars 14 which terminate adjacent to or over the rear axle 15. The rear extremities of the bars 14 are bent outwardly into oppositely extending arms 16 that have depending portions 17 terminating at their lower ends in bearings 18 for the axle 15. At the front of the bars 14 is a bracing or connecting plate 19 which carries a tubular steering post 20, and in this post is a rotating steering rod 21 having handles or grips 22 at its upper extremity. The lower extremity of the steering shaft 21 has oppositely extending arms 23 and 23$^a$ located below the level of the platform 4, and these arms are connected respectively by wires 24 and 24$^a$ with oppositely extending arms 25 and 25$^a$ on the steering fork. All of this steering connection is located below the platform so as not to interfere with the placing of baskets or other receptacles on the latter. Behind the steering post 20 and depending from the bars 14 is a crank hanger 26 stiffened by a brace 27, and in the bearing of this crank hanger is an axle 28 which has pedal cranks 29 and 30. On the axle is a sprocket 31 that drives a chain 32 which meshes with a sprocket wheel 33 on the axle 15. This sprocket wheel 33 is fastened to the axle in any suitable manner, as, for instance, by a pin 34, and the wheel 3 has its hub secured to the axle 15 in any suitable manner, as, for instance, by a pin 35, the other rear wheel 2 being free to rotate on the axle 15. By arranging the wheels in this manner there can be differential rotation without the need of a differential gear. On the bars 14 is a post 36 which carries the rider's seat 37. In order to make use of the room behind the seat 37 the frame of the tricycle is provided with a rear extension B formed of a pair of rearwardly-extending members 38 fastened to the arms 16 and connected by a cross bar 39. On the horizontal platform thus formed a basket or equivalent receptacle C can be placed. The front platform 4 is large enough to receive a plurality of baskets D, Fig. 1.

As shown in Fig. 5, the bottom 40 of each basket has a hook-shaped catch 41 provided with a straight shank 42 which slides through a bearing 44 in the bottom of the basket, and the upper end of this shank is formed into a pushbutton 45, and on the shank is a spring 46 which urges the catch 41 upwardly. This catch 41 is adapted to engage under a cross bar of a platform to hold the basket firmly in place. Lateral shifting of the basket is prevented by providing in the cross bars 10, 11 and 39, a recess or notch 47. The catches 41 by engaging the recesses 47 prevent lateral shifting of the basket on the platform. It will thus be seen that no upstanding sides are required on the platforms to hold the baskets in place. To release a basket it is merely necessary to push downwardly on the pushbutton 45 and the pushbutton can then be turned so as to throw the catch 41 from under the cross bar that it engaged. The basket can then be lifted off the vehicle. As the spring of the catch holds the same normally against the under side of the bottom of the basket the catch does not interfere with the resting of the basket on its bottom.

The form of the frame of the tricycle shown in Figs. 6 and 7 is substantially like the frame shown in the other figures, with the exception that there is a drop in the frame at the middle where the steering post 20' is located. In other words, the bars 14' are considerably below the level of the front platform 4', and these bars 14' are connected with the members 13' by vertical sections 14$^a$ of the metal tubing of which the frame is made. By having this central drop in the frame the crank hanger post 26$^a$ is comparatively short and is hence more rigid. A plurality of bracing bars 50 extend obliquely of the drop section 14$^a$ of the frame, and the bracing bars are rigidly secured at 51 to the drop portions 14$^a$ and are also rigidly secured to the basket-holding cross bar 10' and to the longitudinal bars 14'. By means of these brace bars 50 the frame is considerably stiffened at the central point or midway between the wheels.

From the foregoing description taken in connection with the accompanying drawings, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as are within the scope of the appended claims.

Having thus described my invention, I claim as new and desire to secure by Letters Patent:

1. A vehicle of the class described comprising a frame including a front platform having side members bent inwardly toward each other at the rear, and said inwardly-bent members being extended rearwardly in the form of closely disposed bars, and said bars being bent outwardly in opposite directions and having downwardly extending extremities, and a rear platform carried by the outwardly-bent portions of the said bars; a front steering wheel connected with the front end of the front platform; a rear axle attached to the said downwardly extending extremities of the said bars; wheels on the rear axle; a hanger fastened to the bars of the said frame; driving mechanism supported by the said hanger and connected with the rear axle; a seat supported on the said bars; a fixed hollow post mounted on the said bars at a point in front of the hanger and at the rear of the front platform; a steering handle having a rod journaled in the said post; and connections between the said rod and steering wheel and located under the front platform.

2. A vehicle of the class described comprising a frame formed with a horizontal platform at its front, said platform having side members bent inwardly toward each other at the rear ends and thence downwardly, said downwardly bent portions being extended rearwardly in the form of spaced parallel bars, said bars having their rear portions bent oppositely and terminating in axle bearings, a rear platform connected with the rear portions of the said bars, and braces between the rear part of the front platform and the forward portions of the said bars; a front steering wheel connected with the front part of the platform; a rear axle mounted in the said axle bearings; wheels connected with the axle; a driving mechanism supported by the said parallel bars and operatively connected with the rear wheels; a seat mounted on the said bars; a fixed hollow post fastened to the frame at a point between said parallel bars and the front platform; and a steering device mounted in the post and operatively connected with the steering wheel.

In testimony whereof I have signed my name to this specification in the presence of two subscribing witnesses.

WILLIAM A. BARNES.

Witnesses:
C. BRADWAY,
PHILIP D. ROLLHAUS.

Copies of this patent may be obtained for five cents each, by addressing the "Commissioner of Patents, Washington, D. C."